United States Patent Office 3,135,325
Patented June 2, 1964

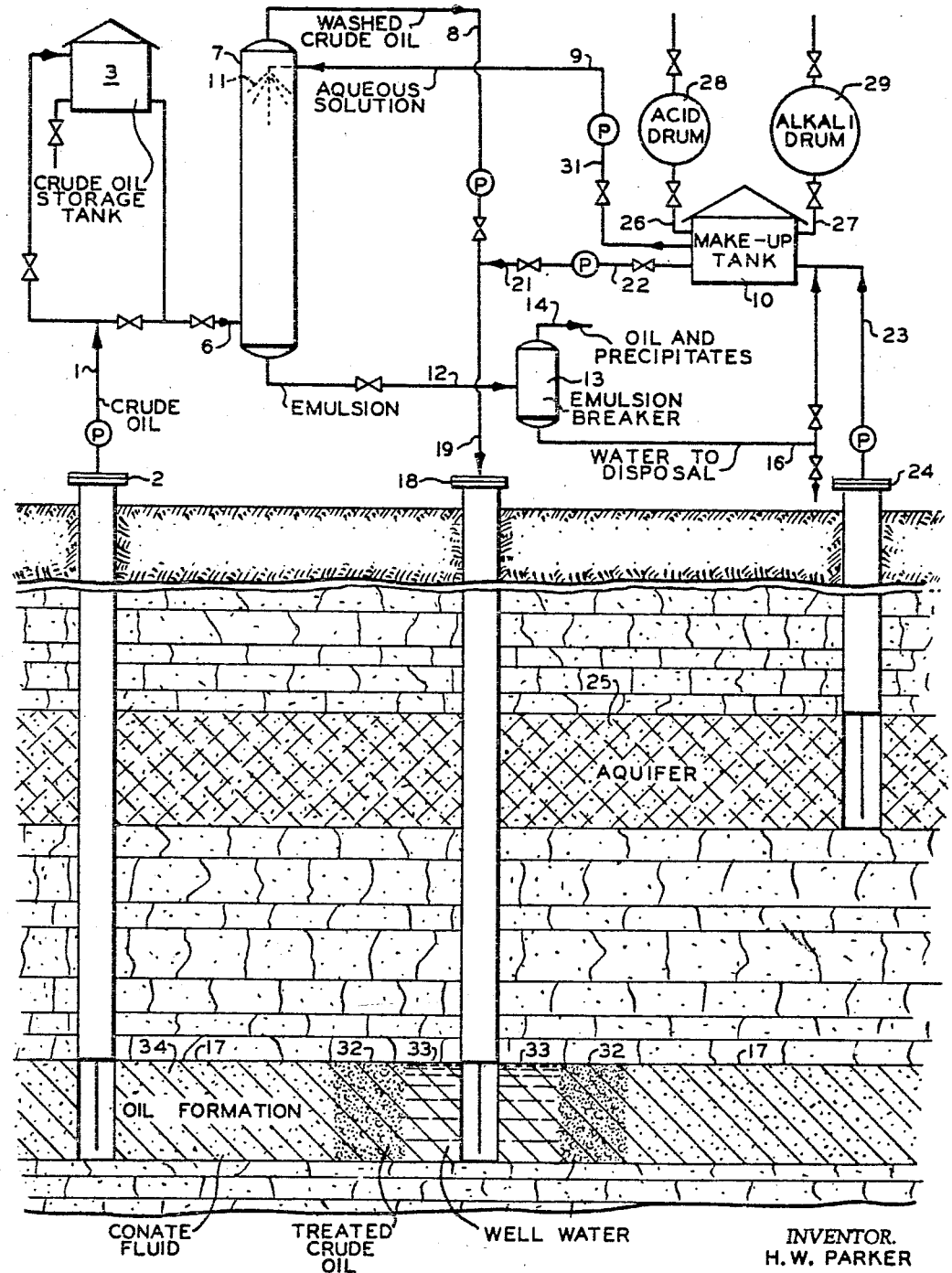

3,135,325
WATER FLOODING TECHNIQUE
Harry W. Parker, Bartlesville, Okla., assignor to Phillips Petroleum Company, a corporation of Delaware
Filed Dec. 18, 1959, Ser. No. 860,517
3 Claims. (Cl. 166—9)

This invention relates to an improved method of water flooding in which crude oil is washed to remove precipitate forming materials before it is injected into the formation to form a slug between the formation oil and later injected water. In another aspect it relates to an oil washing apparatus for economically precipitating and separating the film-forming constituents from a crude oil which is to form a barrier between oil in formation and water injected as a driving fluid. In yet another aspect it relates to washing crude oil with water-diluted acids or alkalies to remove or displace precipitates that would tend to collect at the oil-water interface in the formation during water flooding, thereby plugging small pores, and generally hindering the efficient displacement of oil by water flood.

During the course of inital production of oil from a formation, the reservoir pressure eventually drops to a point so low that it is no longer possible to produce oil at an economical rate by relying on the natural fluid energy in the reservoir. In has then become the general practice in oil production to employ one or more means of secondary recovery. One of these methods is the water flood technique, wherein water is injected into one or more wells to provide an artificial driving force to displace oil from the formation toward adjacent producing wells.

One difficulty with this secondary recovery technique concerns the interaction in the oil containing formation of injected water with many crude oils. Some crude oils contain numerous constituents which form films and precipitates that collect at the oil-water interface, thus significantly inhibiting recovery by plugging small pores, causing high interfacial tensions, and inducing undesirable fingering in the formation. It becomes apparent that some means of avoiding film and precipitate formation would greatly improve the efficiency of the water flooding technique.

I have found that by first washing a portion of the crude oil produced from the lease with water of a quality like that to be injected into the formation, or with a dilute aqueous solution selected from the group consisting of a dilute alkali metal hydroxide, a dilute mineral acid, or a dilute lower carboxylic acid, separating the film and precipitate-forming asphaltic materials which collect at the interface, then injecting a slug of this washed crude oil, prior to injecting water, into the formation, so that the water flooding operation will displace crude oil in formation with greater efficiency, and improved water permeability of the formation will result. This results in the greatly reduced possibility of forming these plugging precipitates.

It is an object of this invention to increase the efficiency with which a water flood will displace crude oil from a formation.

It is another object to eliminate the formation of film-forming constituents and precipitates at the oil-water interface in an oil reservoir undergoing water flooding.

It is another object to provide an improved and economical method of washing from certain crude oils, materials which form precipitates at oil-water interfaces that will plug small pores and induce undesirable fingering.

It is yet a further object to provide a simple apparatus for economically precipitating and separating the film-forming constituents in crude oil to be used as a displacing fluid in the formation.

Other objects and advantages of this invention will become apparent to those skilled in the art from a study of the accompanying disclosure, drawing, and appended claims.

Referring now to the diagrammatic elevational view, showing one embodiment of the crude oil washing apparatus of this invention, conduit 1 is provided for pumping some crude oil, either directly from producing well 2 or from a crude oil storage tank 3, through conduit 6 into column 7. A conduit 8 is provided for withdrawing washed crude oil from the top of column 7. A conduit 9 is provided from a make-up tank 10 for introducing an aqueous solution into sprays 11 located near the top of column 7. A conduit 12 is provided for withdrawing liquid from the bottom of column 7 and passing it to emulsion breaker 13. Column 13 is provided with two outlets, conduits 14 and 16, for withdrawing oil and water, respectively.

In operation, column 7 is initially filled with the aqueous solution to be used, and then crude oil is pumped into column 7, the level of the oil gradually rising until it reaches outlet conduit 8 in the top of column 7. Simultaneously, a washing solution is being continuously dispersed downwardly through spray 11 in order to promote intimate contact between the two liquids flowing countercurrently in column 7. This accelerates the formation of precipitates, or sludge-forming materials, at the oil-aqueous solution interface. These precipitates are carried to the bottom of the column with the water drops, from where they are removed via conduit 12. It may be preferable to remove a small quantity of accumulating crude oil from the bottom of the column along with a washing solution, so that substantially complete removal of the precipitated materials is assured. The liquid leaving column 7 through conduit 12 will contain an emulsion, which is broken down in emulsion breaker 13. The separated oil may be further purified for other use, while the water is returned to the aqueous solution make-up tank 10, or sent to waste disposal, if more convenient.

In the water flooding operation, a treated crude oil slug is injected into the oil-bearing formation 17 via well 18, prior to the injection of flooding water, in a quantity sufficient to insure a substantial barrier between the oil formation and the injected water. The washed crude oil will displace the natural crude uniformly since the viscosity of the two will be about equal, and the treated and untreated oils will be miscible.

The washed crude oil slug is then followed with water coming via conduits 19, 21, 22, tank 10, conduit 23, and from water well 24, which is drawing water from aquifer 25. While water passing from tank 10 is being injected into formation 17, the feed conduits 26 and 27 from acid and alkali drums 28 and 29 on make-up tank are shut off. Also, conduit 31 to the top of column 7 is cut-off, and water from tank 10 can flow only to injection well 18.

In the formation, since the precipitate-forming materials have been removed from the injected crude oil slug 32, the injected water 33 will displace oil in formation 34 with greater efficiency, than by direct contact with untreated crude oil. The produced crude oil from well 2 can all be directed to storage tank 3, or part of it pumped directly to the bottom of column 7.

Although water can readily be used for washing the crude oil slug, prior to injection, other aqueous solutions of common acids and alkalies will give an additional benefit. The aqueous solution may be selected from the group consisting of dilute alkali metal hydroxide, dilute mineral acid, and dilute lower carboxylic acids. Suitable alkali metal hydroxides are calcium hydroxide, potassium hydroxide, and sodium hydroxide, the latter is to be preferred because of its most plentiful supply. Satisfactory mineral acids to be used in the washing solution include hydrochloric acid, sulfuric acid, and nitric acid. Among the lower carboxylic acids which may be used to slightly acidify the washing solution are, acetic acid, benzoic acid, citric acid, and oxalic acid. Lower carboxycylic acids of value in practicing the invention include those of the preceding sentence, which are preferred because of high acidity and economics, but any carboxycylic acid having from one to ten carbon atoms are useful in the invention. All of these acids and alkalies are used in relatively dilute concentrations. In aqueous solutions, concentrations that will give a pH of between 1 and 12 are satisfactory for the purpose of this invention.

Well water varies from well to well, and contains dissolved minerals, such as sodium chloride, in minor amounts, but as long as experience shows the mineral content is insufficient to cause plugging of the oil bearing formation into which it is being injected, it is useful in the practice of the present invention. Although well water is preferred because of its relative purity, any large volume source of water, such as rain water from streams or lakes may be employed.

A batch method of preparing a slug of treated crude oil may also be employed. This would comprise contacting the crude oil with an aqueous solution or water, selected from the group mentioned above, in a tank. Next, stratifying the admixture to form an aqueous phase and a treated crude oil phase, substantially free of said precipitate. Finally, decanting the treated crude oil phase from the water phase as the product to be injected into the formation, prior to the injection of water.

Various modifications and alterations to this invention will become apparent to those skilled in the art without departing from the spirit and scope of the invention, and it should be understood that the latter is not necessarily limited to the aforementioned discussion and accompanying drawing. For example, after enough water has been injecter to form a separation layer it can be followed by an injected drive gas, such as methane, ethane, flue gas, or air without departing from the invention.

I claim:

1. The method of substantially reducing the concentration of film and precipitate forming materials in crude oil which is to be used as a slug between crude oil in formation and injected water in a water flood system, said method comprising contacting said crude oil with an aqueous solution selected from the group consisting of a dilute alkali metal hydroxide, a dilute mineral acid, a dilute lower carboxylic acid and water, thereby preferentially concentrating a substantial part of said materials at the oil-water interface, separating the treated crude oil from said materials suspended at said interface, recovering said treated crude oil from a separation zone, injecting a slug of said treated oil into said formation prior to the injection of water, and then injecting water into said formation behind said treated crude oil, whereby said injected water displaces said oil in said formation with greater efficiency and results in increased recovery of oil and improved water permeability of said formation.

2. The method of substantially reducing the concentration of film and precipitate forming materials in crude oil which is to be used as a slug between crude oil in formation and injected water in a water flood system, said method comprising contacting said crude oil with an aqueous solution selected from the group consisting of a dilute alkali metal hydroxide, a dilute mineral acid, a dilute lower carboxylic acid and water, the acids and bases of said group being used in a concentration such that said aqueous solution will have a pH between 1 and 12, thereby preferentially concentrating a substantial part of said materials at the oil-water interface, separating the treated crude oil from said materials suspended at said interface, recovering said treated crude oil from a separation zone, injecting a slug of said treated oil into said formation prior to the injection of water, and then injecting water into said formation behind said treated crude oil, whereby said injected water displaces said oil in said formation with greater efficiency and results in increased recovery of oil and improved water permeability of said formation.

3. The method according to claim 1 wherein said aqueous solution is dilute sodium hydroxide.

4. The method according to claim 1 wherein said aqueous solution is dilute sulfuric acid.

5. The method according to claim 1 wherein said aqueous solution is dilute acetice acid.

6. The method according to claim 1 wherein said aqueous solution is well water.

7. The method of substantially reducing the concentration of film and precipitate forming materials in a crude oil which is to be used as a slug between crude oil in formation and injected water in a water flood system, said method comprising feeding said crude oil from said formation into the lower portion of an enclosed vessel and withdrawing the washed oil from the upper portion of said vessel, spraying an aqueous solution selected from the group consisting of a dilute alkali metal hydroxide, a dilute mineral acid, a dilute lower carboxylic acid, and well water in the top of said vessel downwardly through the rising crude oil, withdrawing the precipitates formed at the oil-water interface of said crude oil and said aqueous solution from the bottom portion of said vessel, passing an emulsion contained in said aqueous solution to an emulsion breaker wherein entrained oil, said solution, and said precipitates are separated, and injecting said washed crude oil into said formation prior to the injection of flooding water.

8. Apparatus for substantially reducing the formation of film and precipitate-forming materials in an underground oil reservoir undergoing water flooding, said apparatus comprising, in combination, first conduit means for conducting produced crude oil from a well penetrating said reservoir to a storage vessel, second conduit means for passing crude oil from said storage vessel into the bottom of an enclosed vessel, third conduit means for withdrawing washed crude oil from the upper portion of said enclosed vessel and passing to an injection well penetrating said reservoir, a make-up vessel for preparing an aqueous solution, fourth conduit means from said make-up vessel for spraying an aqueous solution in the top portion of said enclosed vessel downwardly, an emulsion breaker, a fifth conduit means for withdrawing a liquid from the bottom portion of said enclosed vessel and passing an emulsion in said liquid to said emulsion breaker, sixth conduit means for withdrawing precipitate-containing crude oil from the top portion of said emulsion breaker, seventh conduit means for withdrawing water from the bottom portion of said emulsion breaker, and eight conduit means for passing well water from a well penetrating an aquifer to said make-up vessel.

References Cited in the file of this patent

UNITED STATES PATENTS

| | | |
|---|---|---|
| 840,381 | Sawdon | Jan. 1, 1907 |
| 2,131,525 | Schulze | Sept. 27, 1938 |
| 2,165,703 | Holmes | July 11, 1939 |
| 2,249,746 | Colbeth | July 22, 1941 |
| 2,308,001 | Forney | Jan. 12, 1943 |
| 2,457,959 | Walker | Jan. 4, 1949 |
| 2,531,547 | Ayres | Nov. 28, 1950 |
| 2,669,306 | Teter et al. | Feb. 16, 1954 |
| 2,669,307 | Mulholland et al. | Feb. 16, 1954 |
| 2,798,556 | Binder et al. | July 9, 1957 |